March 25, 1958 A. G. GRANATH 2,827,677
MOLD SHAKEOUT APPARATUS
Filed Aug. 2, 1954 4 Sheets-Sheet 1
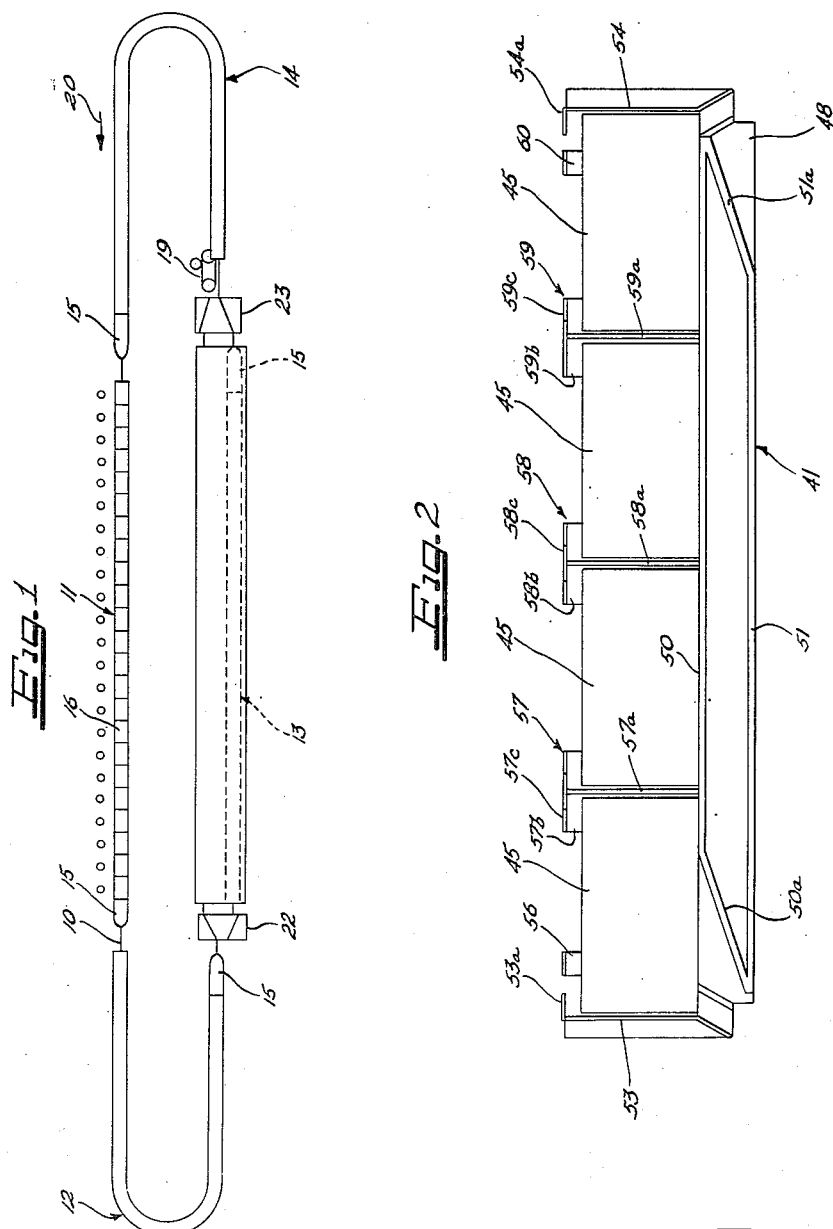
Inventor
AXEL G. GRANATH

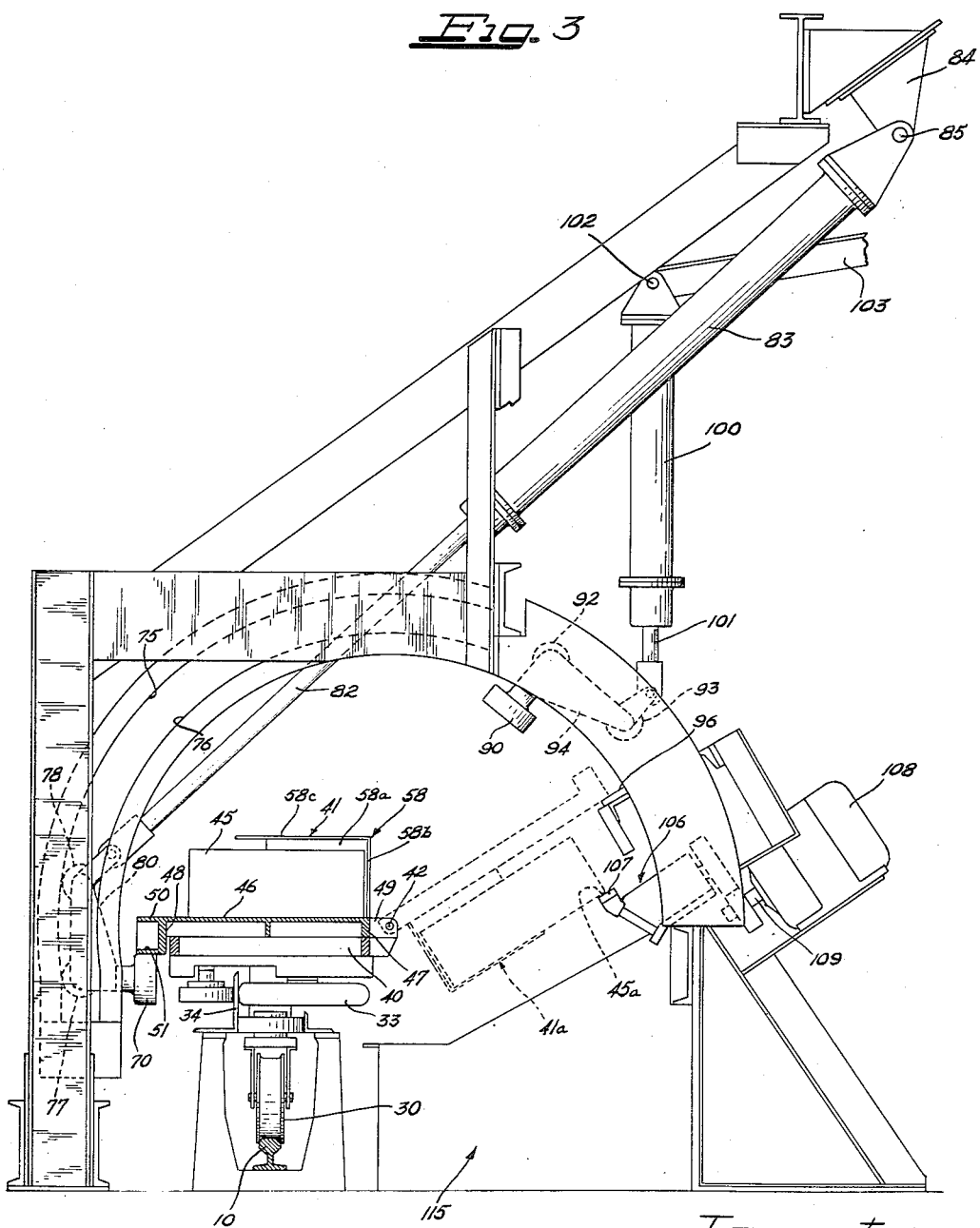

March 25, 1958     A. G. GRANATH     2,827,677
MOLD SHAKEOUT APPARATUS

Filed Aug. 2, 1954     4 Sheets-Sheet 3

Inventor
AXEL G. GRANATH
by Hill, Sherman, Meroni, Gross & Simpson
Attys.

March 25, 1958     A. G. GRANATH     2,827,677
MOLD SHAKEOUT APPARATUS

Filed Aug. 2, 1954     4 Sheets-Sheet 4

Inventor
AXEL G. GRANATH
by Hill, Sherman, Meroni, Gross & Simpson
Attys.

United States Patent Office 2,827,677
Patented Mar. 25, 1958

2,827,677

MOLD SHAKEOUT APPARATUS

Axel G. Granath, Chicago, Ill., assignor to Herbert Simpson Corporation, Chicago, Ill., a corporation of Illinois Application August 2, 1954, Serial No. 447,345

4 Claims. (Cl. 22—95.7)

This invention relates to an automatic shakeout system and method for tight flask molds.

The manual labor involved at the shakeout station in existing foundry molding systems is very undesirable, and the job is hard to fill. The present invention provides a completely automatic shakeout system, and the first such system capable of use with tight flask molds.

It is the object of the present invention to provide a novel shakeout system and method for operation in conjunction with a mold conveyor.

Another object of the present invention is to provide a completely automatic shakeout system for tight flask molds.

A further object of the present invention is to provide a novel mold conveyor for tight flask molds.

Still another object is to provide a novel tray inverting device for use with such a conveyor.

Yet another object of the present invention is to provide a novel tray return mechanism for use with a mold conveyor having a pivoted tray.

Other objects, features and advantages of the present invention will be more fully apparent from the following detailed description, taken in connection with the accompanying drawings, in which:

Figure 1 is a diagrammatic plan view of a simplified mold conveyor system with which the present invention is adapted to be utilized;

Figure 2 is a partial side elevational view of a mold conveyor tray having tight flask molds associated therewith and constructed in accordance with the principles of the present invention;

Figure 3 is a more or less schematic fragmentary cross sectional view illustrating a mold conveyor tray inverting apparatus constructed in accordance with the teachings of the present invention;

As shown on the drawings:

Figure 4:
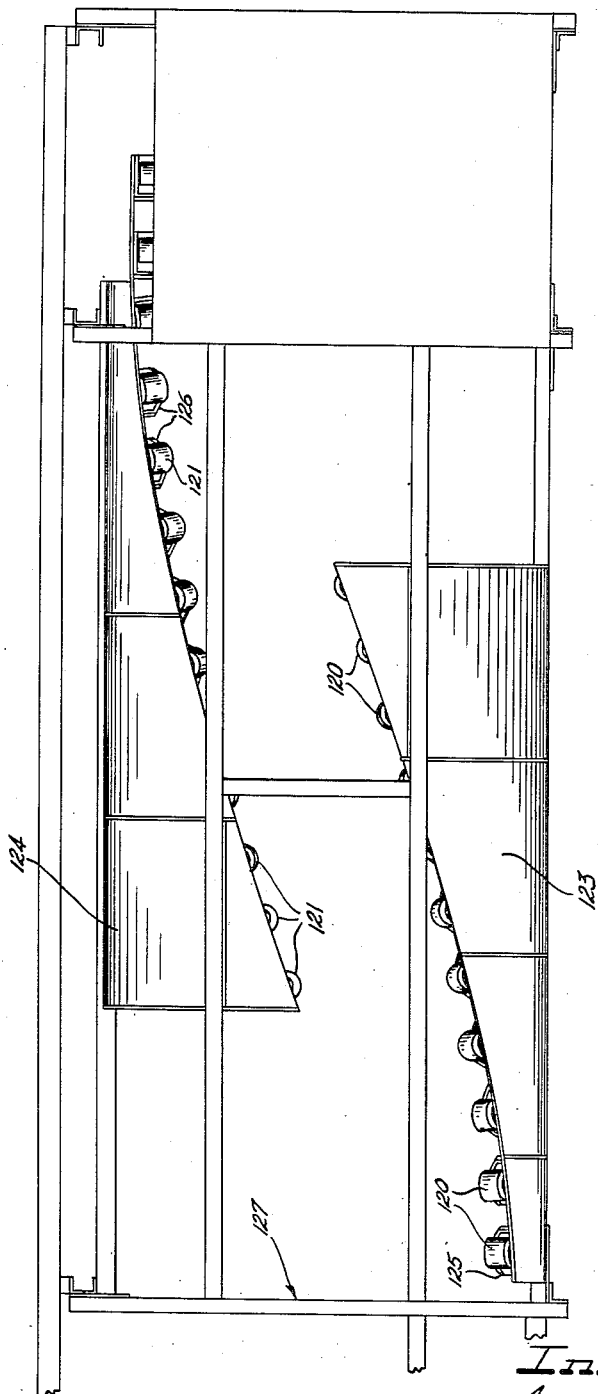
Figure 4 is a more or less diagrammatic fragmentary plan view illustrating a mold conveyor tray return mechanism in accordance with the present invention.

The automatic shakeout system of the present invention may suitably be employed with a mold conveyor system such as illustrated in Patent 2,229,492. Reference is made to said patent for a more detailed disclosure of a mold conveying system with which the present invention may be utilized.

As indicated schematically in Figure 1, the mold conveyor system may comprise a monorail conveyor track 10 having a plurality of mold conveyor trains 11, 12, 13 and 14 moveable therealong. The trains may each comprise an electric drive car 15 and a plurality of cars such as 16 for carrying the molds. Trains 11, 12 and 13 are shown as disposed respectively at the molding, pouring and cooling zones or stations of the system. The trains in these zones are driven by the electric drive cars at the head of each train. The train 14 is illustrated as being at the shakeout station and a variable speed caterpillar drive 19 is provided for moving the train 14 slowly through the shakeout station, while the trains in the other station are at rest. When the train 14 has passed through the shakeout station, the train 14 will actuate a master limit switch which energizes the bus bars and starts all the trains simultaneously whereupon each train moves in the direction of the arrow 20 in Figure 1, to the next station. It will be understood that if desired, more than one train may be in the cooling section at a given time and switch means indicated at 22 and 23 may be provided for switching successive trains to and from the track section in the cooling zone.

As seen in Figure 3, the monorail 10 may have a wheel 30 of a drive car 15 riding thereon. The drive car 15 impels itself by means of a driving tire such as indicated at 33 engaging a stationary drive rail 34. The cars each comprise a base portion such as indicated at 40 to which is hinged at one longitudinal side a mold conveyor tray indicated generally at 41. As seen in Figure 3, the tray 41 is pivoted to the base 40 by means of a shaft 42 for pivotal movement from a generally horizontal position shown in solid outline in Figure 3, resting on the base 40 to an inverted position indicated in dash outline at 41a in Figure 3. Figure 2 illustrates a mold conveyor tray detached from the base and provided with four mold receiving compartments each having a mold flask diagrammatically indicated at 45 associated therewith. Referring to Figure 3, the tray comprises a bottom plate 46 having downturned flanges 47 and 48 at the longitudinal sides thereof, the flange 47 having a pivot bracket 49 secured thereto receiving the shaft 42, and the flange 48 being provided with an upper edge plate 50 and a lower edge plate 51. As shown in Figure 2, the edge plates 50 and 51 extend along a major portion of the length of the mold conveyor tray, the upper edge plate 50 being provided with a forward inclined upper edge plate portion 50a, and the lower edge plate 51 being provided with a rear inclined edge portion 51a.

For mounting the molds 45 on the tray 41, the tray is provided with end retaining arms 53 and 54 and side retaining arms 56, 57, 58, 59 and 60. Side arms 57, 58 and 59 provide transverse partition portions 57a, 58a and 59a, side flange portions 57b, 58b and 59b, and overhanging retaining portions 57c, 58c and 59c which cooperate with overhanging portions 53a, 54a of the end arms to confine the mold flasks 45 within the respective compartments of the tray 41. It will be observed from Figure 3 that the overhanging flanges such as 58c and the partitions 58a have a limited transverse extent so that one transverse edge of the mold 45, namely that edge away from the pivot 42 is exposed at its upper surface.

In the illustrated embodiment, the bottom boards of the molds are squeezed into steel flasks and the present invention contemplates the inversion of the flask during the shakeout operation. As illustrated in Figure 3, a suitable inverting mechanism may comprise a first roller 70 for engaging the under surface of the edge flange 51 as the mold conveyor tray is moved slowly through the shakeout section of the system. The inverting mechanism may be energized through a solenoid valve by means of limit switches that engage the mold conveyor flange wheels so that the roller 70 begins to pivot the tray 41 about shaft 42 soon after the edge flange 51 travels over the roller 70. The edge flange 51 continues to ride along the roller 70 as the roller 70 is raised to pivot the tray 41 upwardly. The roller 70 is guided for arcuate movement about the axis of pivot shaft 42 by means of tracks 75 and 76 cooperating with rollers 77 and 78 of a carriage 80 mounting roller 70. The carriage 80 is moved along the track 75, 76 by means of a piston 82 and cylinder 83, the piston being pivotally connected to the carriage at one end and the cylinder being pivotally connected to a fixed bracket 84 on a pivot shaft 85. The cylinder 83 is operative to raise the roller 70 and pivot the tray 41 through approximately 90°, the momentum of the tray then carrying the center of gravity of the tray past the pivot 42 after which the upper edge flange 50 engages a second roller 90 which is similarly constrained for arcuate movement about the pivot 42 by means of rollers 92 and 93 on a carriage 94, the second roller 90 being operative to gently lower the tray so that it rests on a riding bar 96. The conveyor continues to move along the track 10 and after the rear end of the upper edge 50 has moved past the second roller 90, cylinder 100 is actuated to retract piston 101 to return the carriage 94 to its initial position indicated in Figure 3. The cylinder 100 is pivoted by means of a shaft 102 to a fixed frame member 103 in a manner similar to the cylinder 83.

It will be observed from Figure 3, that an edge of the mold flask indicated at 45a in Figure 3 is engaged by a shakeout device 106 which is located at a position where a second riding bar (not shown) is broken away. The second riding bar engages the flasks as the tray is inverted and maintains the flasks spaced above the path of vertical reciprocation of a mold engaging head 107 of shakeout 106. When a flask moves off the second rail, it drops into engagement with the shakeout head 107, which may be driven by means of a motor 108 through a shaft 109. An eccentric member (not shown) may be carried on the shaft 109 for vibrating the engagement portion 107. Such shakeout devices are well known in the art and need not be described in detail.

It will be understood that suitable means are disposed in the general area indicated at 115 along the track 10 in Figure 3 to receive material shaken from the molds 45.

Figure 5:
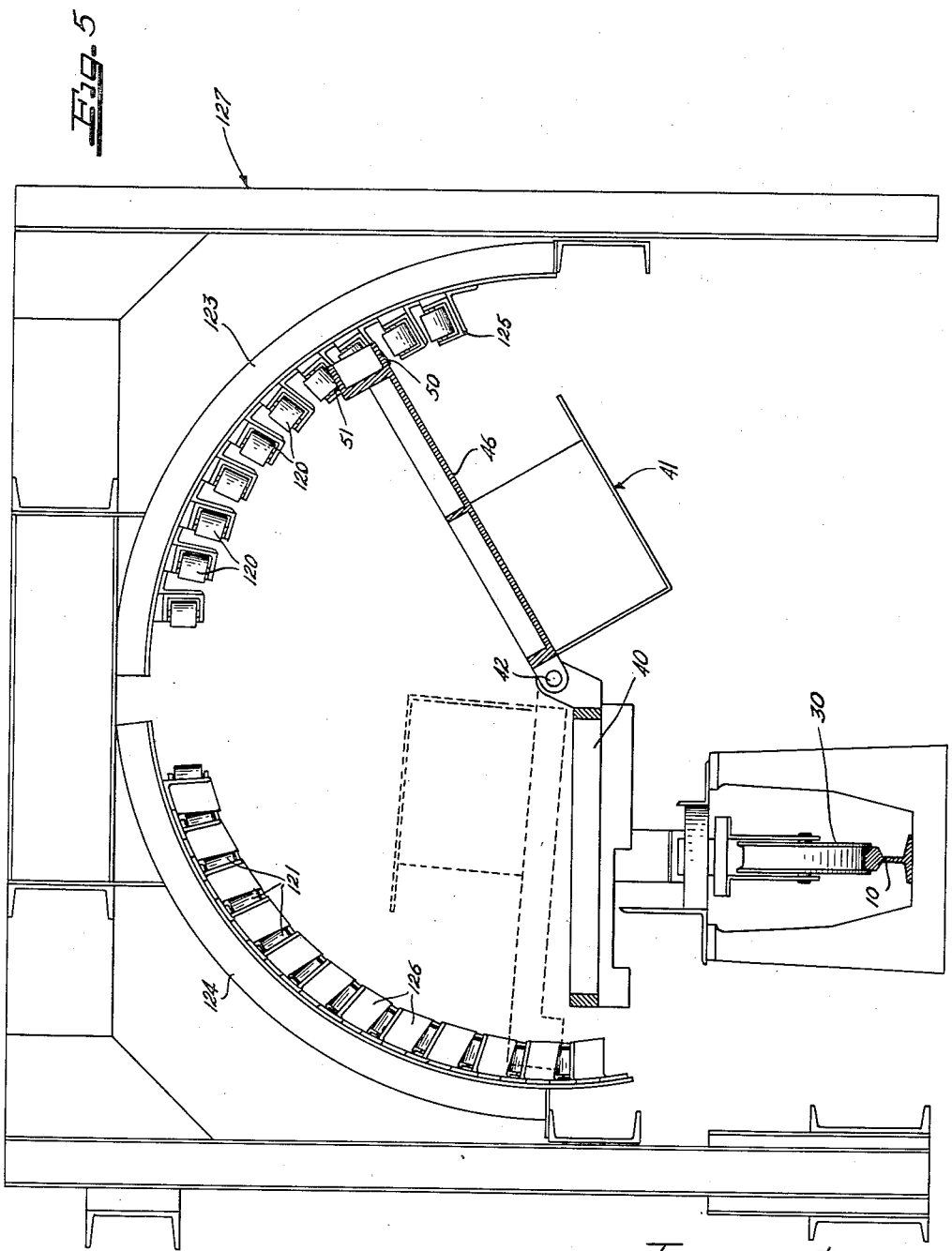
Figure 5 is a fragmentary more or less diagrammatic cross sectional view illustrating the mold conveyor tray return apparatus shown in Figure 4.

After the conveyor has been moved past the shakeout mechanism 106, the mold conveyor tray is pivoted back to its upright position by means of a return mechanism illustrated in Figures 4 and 5. At the end of the riding bar 96 is disposed a first series of rollers 120 for engaging the inclined forward upper surface 50a, Figure 2, to guide the tray progressively upwardly about the pivot 42. These rollers 120 pivot the center of gravity of the tray past the pivot 42 so that the tray pivots over to ride against the rollers 121 disposed to engage the trailing undersurface 51a and guide the tray downwardly to its initial upright position, at which time the tray rests on the base portion 40 of the conveyor car. It will be understood that the rollers 120 and 121 are generally helically disposed with relation to the path of travel of the pivot shaft 42. Further, it will be understood that the slope of the edges 51a and 50a generally corresponds to the slope of the rollers. By way of example, the rollers 120 and 121 may be mounted on spiral plates 123 and 124 by means of brackets 125 and 126 for rotation relative thereto, and the plates 123 and 124 may be mounted by means of a suitable framework indicated generally at 127.

It may be emphasized that the caterpillar drive operates continuously to move a train through the shakeout station, and that inverting mechanism shown in Figure 3 and the return mechanism shown in Figures 4 and 5 is adapted to automatically cooperate with the conveyor as the conveyor moves along to carry out the required operations. The shakeout system of the present invention is thus fully automatic requiring no manual labor in the shakeout operation.

It will be apparent that many modifications and variations may be effected without departing from the scope of the novel concepts of the present invention.

I claim as my invention:

1. In a mold shakeout apparatus, a mold conveyor for longitudinal movement, a mold retaining tray pivotally connected to said mold conveyor for transverse pivotal movement relative thereto, inverting means disposed along the path of said conveyor for pivoting said tray into an inverted position, means for thereafter acting on a mold carried by said tray to vibrate the same, and tray return means for pivoting said tray back to normal position, said inverting means comprising a first roller disposed for engagement beneath a longitudinal edge undersurface of said tray, means for moving said first roller in a circular arc about the pivot for said tray to move said tray toward inverted position as the tray longitudinal edge moves along said first roller, a second roller disposed for engaging beneath a longitudinal edge upper surface upon pivoting of said tray past vertical disposition, and means for moving said second roller in a circular arc about said tray pivot to lower said tray toward inverted position.

2. In a mold shakeout apparatus, a mold conveyor for longitudinal movement, a mold retaining tray pivotally connected to said mold conveyor for transverse pivotal movement relative thereto, inverting means disposed along the path of said conveyor for pivoting said tray into an inverted position, said inverting means comprising a first roller disposed for engagement beneath a longitudinal edge undersurface of said tray, means for moving said first roller in a circular arc about the pivot for said tray to move said tray toward inverted position as the tray longitudinal edge moves along said first roller, a second roller disposed for engaging beneath a longitudinal edge upper surface upon pivoting of said tray past vertical disposition, and means for moving said second roller in a circular arc about said tray pivot to lower said tray toward inverted position, a riding bar for engaging said tray to hold the same in inverted disposition as the tray is moved longitudinally by said conveyor, and shakeout means for engaging an edge of a mold flask carried by said tray to shake the contents therefrom.

3. In a mold shakeout apparatus, a mold conveyor for longitudinal movement, a mold retaining tray pivotally connected to said mold conveyor for transverse pivotal movement relative thereto, inverting means disposed along the path of said conveyor for pivoting said tray into an inverted position, said inverting means comprising a first roller disposed for engagement beneath a longitudinal edge undersurface of said tray, and means for moving said first roller in a circular arc about the pivot for said tray to move said tray toward inverted position as the tray longitudinal edge moves along said first roller, a second roller disposed for engaging beneath a longitudinal edge upper surface upon pivoting of said tray past vertical disposition, and means for moving said second roller in a circular arc above said tray pivot to lower said tray toward inverted position, a riding bar for engaging said tray to hold the same in inverted disposition as the tray is moved longitudinally by said conveyor, shakeout means for engaging an edge of a mold flask carried by the tray to shake the contents therefrom, and means for continuously moving said conveyor past said inverting means and said shakeout means during operation thereof.

4. A tray pivoting mechanism for cooperation with a tray pivotally carried by a longitudinally movable conveyor, comprising a first roller for engaging an edge undersurface of the tray and for arcuate movement about the tray pivot to move the tray toward a vertical disposition, and a second roller for engaging an edge upper surface of the tray and for arcuate movement about the tray pivot to lower the tray from a vertical disposition to an inverted disposition.

References Cited in the file of this patent

UNITED STATES PATENTS

| | | |
|---|---|---|
| 667,975 | Dodge | Feb. 12, 1901 |
| 708,698 | Dodge | Sept. 9, 1902 |
| 1,047,252 | Lawson | Dec. 17, 1912 |
| 1,893,633 | Peterson et al. | Jan. 10, 1933 |
| 2,236,471 | Eppensteiner | Mar. 25, 1941 |
| 2,431,174 | Henry | Nov. 18, 1947 |
| 2,524,887 | Curtis et al. | Oct. 10, 1950 |
| 2,525,572 | Woody et al. | Oct. 10, 1950 |
| 2,597,246 | Kelly | May 20, 1952 |